United States Patent
Nakagawa

(10) Patent No.: US 10,479,208 B2
(45) Date of Patent: Nov. 19, 2019

(54) NON-CONTACT CHARGING SYSTEM

(71) Applicant: HONDA MOTOR CO., LTD., Tokyo (JP)

(72) Inventor: Tomoaki Nakagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 28 days.

(21) Appl. No.: 15/920,602

(22) Filed: Mar. 14, 2018

(65) Prior Publication Data

US 2018/0264961 A1    Sep. 20, 2018

(30) Foreign Application Priority Data

Mar. 15, 2017 (JP) .................................. 2017-050276

(51) Int. Cl.
| | | |
|---|---|---|
| H02J 7/00 | (2006.01) | |
| B60L 11/18 | (2006.01) | |
| H02J 50/60 | (2016.01) | |
| H02J 7/02 | (2016.01) | |

(52) U.S. Cl.
CPC ......... *B60L 11/1825* (2013.01); *H02J 7/0047* (2013.01); *H02J 7/025* (2013.01); *H02J 50/60* (2016.02)

(58) Field of Classification Search
CPC .................................................. B60L 11/1825
USPC .......................................................... 320/108
See application file for complete search history.

(56) References Cited

U.S. PATENT DOCUMENTS

| | | | | |
|---|---|---|---|---|
| 6,624,529 B2 * | 9/2003 | Obayashi | ................. | H02J 1/14 290/40 B |
| 2002/0113441 A1 * | 8/2002 | Obayashi | ................. | H02J 1/14 290/40 C |
| 2011/0254503 A1 * | 10/2011 | Widmer | ................. | B60L 11/182 320/108 |
| 2011/0270462 A1 * | 11/2011 | Amano | ................. | H02J 7/025 700/297 |
| 2011/0285349 A1 * | 11/2011 | Widmer | ................. | B60L 11/182 320/108 |
| 2011/0302078 A1 * | 12/2011 | Failing | ................. | B60L 3/00 705/39 |

(Continued)

FOREIGN PATENT DOCUMENTS

| | | |
|---|---|---|
| JP | 2012-165498 A | 8/2012 |
| JP | 5258521 B2 | 8/2013 |
| JP | 2015-104161 A | 6/2015 |

(Continued)

OTHER PUBLICATIONS

Sep. 25, 2018, Japanese Office Action issued for related JP application No. 2017-050276.

*Primary Examiner* — Yalkew Fantu
(74) *Attorney, Agent, or Firm* — Paratus Law Group, PLLC

(57) ABSTRACT

A non-contact charging system includes: a power receiving unit mounted on a transportation device; a power transmission unit, installed on a flat surface, configured to transmit power to the power receiving unit in a non-contact manner; and a power supply unit configured to control power supply to the power transmission unit, the power supply unit including an operation portion configured to temporarily stop or resume non-contact power transmission from the power transmission unit to the power receiving unit.

4 Claims, 3 Drawing Sheets

(56) References Cited

U.S. PATENT DOCUMENTS

2012/0200151 A1* 8/2012 Obayashi ................ H02J 7/025
                                                                 307/9.1
2014/0203768 A1* 7/2014 Andic ........................ H02J 7/00
                                                                 320/108

FOREIGN PATENT DOCUMENTS

JP      2016-073080 A      5/2016
WO    WO 2015/075858 A1   5/2015

* cited by examiner

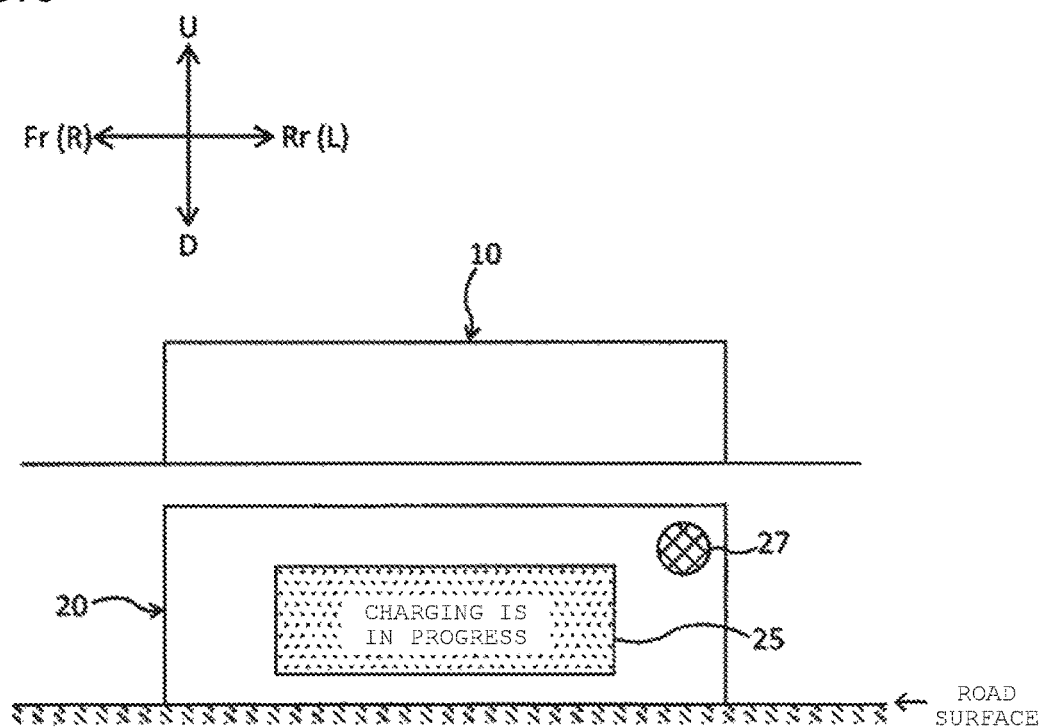

NON-CONTACT CHARGING SYSTEM

CROSS-REFERENCE TO RELATED APPLICATION

The present application claims the benefit of priority of Japanese Patent Application No. 2017-050276, filed on Mar. 15, 2017, the content of which is incorporated herein by reference.

BACKGROUND

1. Field of the Invention

The present invention relates to a non-contact charging system using non-contact power transmission technology.

2. Description of the Related Art

Japanese Patent No. 5258521 discloses a power supply system of quickly detecting an obstacle such as a person or an object between a power transmission unit and a power receiving unit to control the power supply state in a system for feeding electric power in a non-contact manner. In the power supply system, when transmission efficiency detected by a transmission efficiency detection unit is lower than a specified value, there may be an obstacle between the power transmission unit and the power receiving unit. Therefore, in this case, power transmission is temporarily stopped, and low power is periodically transmitted to detect the efficiency. After that, when the transmission efficiency reaches or exceeds the specified value, the transmission is resumed with regular power.

According to the power supply system disclosed in Japanese Patent No. 5258521, when the transmission efficiency drops below a specified value, it is determined that an obstacle may exist between the power transmission unit and the power receiving unit, and thus power transmission is temporarily stopped. For this reason, the obstacle may be affected by magnetic field exposure until the power transmission is completely stopped.

Particularly, during non-contact power supply to a vehicle, when the strength of magnetic field generated between the power transmission unit and the power receiving unit exceeds a reference value, it is required to take a precautionary measure under the provision against magnetic field exposure to human bodies according to the draft version of the national standard "SAE J2954 v.39 draft" published by the Society of Automotive Engineers (SAE). For this reason, there is a demand for a system in which it is possible to take a precautionary measure following the standards against magnetic field exposure to human bodies according to the provision.

In the power supply system, when the obstacle is small enough that the transmission efficiency does not fall below a specified value, this obstacle is continuously affected by magnetic field exposure. However, if the obstacle is a metal piece, the metal piece may generate heat when exposed to magnetic field, resulting in damage to the power transmission unit. Therefore, it is necessary to quickly and reliably remove an obstacle between the power transmission unit and the power receiving unit.

At the time of removing an obstacle between the power transmission unit and the power receiving unit, when a person who has initiated non-contact power transmission or who can control non-contact power transmission is on the spot, the person can stop the non-contact power transmission. However, if not, that is, when a person who has initiated non-contact power transmission or who can control non-contact power transmission is not on the spot, there is only way to get rid of the obstacle by another person (a third party) while being affected by magnetic field exposure.

SUMMARY

An object of the present invention is to provide a non-contact charging system enabling a third party as well as a specific person to take a precautionary measure against magnetic field exposure and then to remove an obstacle between a power transmission unit and a power receiving unit.

According to a first aspect of the invention, there is provided a non-contact charging system including: a power receiving unit mounted on a transportation device; a power transmission unit, installed on a flat surface, configured to transmit power to the power receiving unit in a non-contact manner; and a power supply unit configured to control power supply to the power transmission unit, the power supply unit including an operation portion configured to temporarily stop or resume non-contact power transmission from the power transmission unit to the power receiving unit.

According to a second aspect of the invention, the non-contact charging system according to the first aspect, further includes an informing unit configured to inform visually about information indicating that the non-contact power transmission is in progress while the power transmission unit is performing the non-contact power transmission.

According to a third aspect of the invention, in the non-contact charging system according to the second aspect, at least the informing unit corresponding to visual information is provided in the power transmission unit.

According to a fourth aspect of the invention, the non-contact charging system according to any one of the first to third aspects, further includes a warning unit configured to issue a warning when the non-contact power transmission is temporarily stopped in response to an operation to the operation portion.

According to a fifth aspect of the invention, the non-contact charging system according to the fourth aspect, further includes a notification unit configured to send an electronic notification to a predetermined destination corresponding to an owner of the transportation device, wherein when a predetermined time elapses in a state where the non-contact power transmission is not resumed after the non-contact power transmission is temporarily stopped in response to the operation of the operation unit, the warning unit stops issuing the warning, and the notification unit sends an electronic notification indicating that the non-contact power transmission is temporarily stopped due to the operation of the operation portion to the predetermined destination.

According to a sixth aspect of the invention, the non-contact charging system according to any one of the first to fourth aspects, further includes a notification unit configured to send an electronic notification indicating that the non-contact power transmission is temporarily stopped or is resumed due to the operation of the operation portion to a predetermined destination corresponding to an owner of the transportation device.

According to the first aspect of the invention, even when an obstacle enters between the power transmission unit and the power receiving unit during the non-contact power transmission, a person who intends to remove the obstacle can operate the operation portion of the power supply unit to temporarily stop the non-contact power transmission and then remove the obstacle. Since the operation portion can be operated by a third party as well as a specific person who has initiated the non-contact power transmission, a person who intends to remove the obstacle can remove the obstacle between the power transmission unit and the power receiving unit after taking a precautionary measure against magnetic field exposure. After the obstacle is removed, since the non-contact power transmission can be resumed by operating the operation portion again, it is possible to save labor of the specific person.

According to the second aspect of the invention, a person who intends to remove the obstacle can easily recognize that the non-contact power transmission is in progress due to the visual or audible information informed by the informing unit.

According to the third aspect of the invention, a person who intends to remove the obstacle can certainly recognize that the non-contact power transmission is in progress from at least the visual information informed by the informing unit when the person bends down and looks at the obstacle between the power transmission unit and the power receiving unit.

According to the fourth aspect of the invention, since the warning unit issues the warning when the non-contact power transmission is temporarily stopped in response to the operation of the operation portion, a person who intends to remove the obstacle can recognize a state where the non-contact power transmission is temporarily stopped. In addition, it is possible to prompt resumption of the non-contact power transmission with the warning. Furthermore, it is possible to prevent continuation of temporary stop of non-contact power transmission due to mischief, or the like by the warning.

According to the fifth aspect of the invention, even though the owner of the transportation device is at a position away from the installation place of the non-contact charging system such that the owner cannot recognize the warning made by the warning unit, the owner can be notified of an event that the non-contact power transmission is temporarily stopped due to the operation of the operation portion, from the electronic notification sent to the predetermined destination Y. In addition, since the warning is stopped when the predetermined time elapses from the temporary stop of the non-contact power transmission, it is possible to eliminate annoyance caused by continuation of the warning.

According to the sixth aspect of the invention, even though the owner of the transportation device is at a position away from the installation place of the non-contact charging system, the owner can be notified of a charging state where the non-contact power transmission is temporarily stopped or is resumed due to the operation of the operation portion from the electronic notification sent to the predetermined destination.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 3 is an enlarged side view illustrating a state where non-contact power transmission from a power transmission device to a power receiving device is being performed.

DETAILED DESCRIPTION OF THE INVENTION

Figure 1:
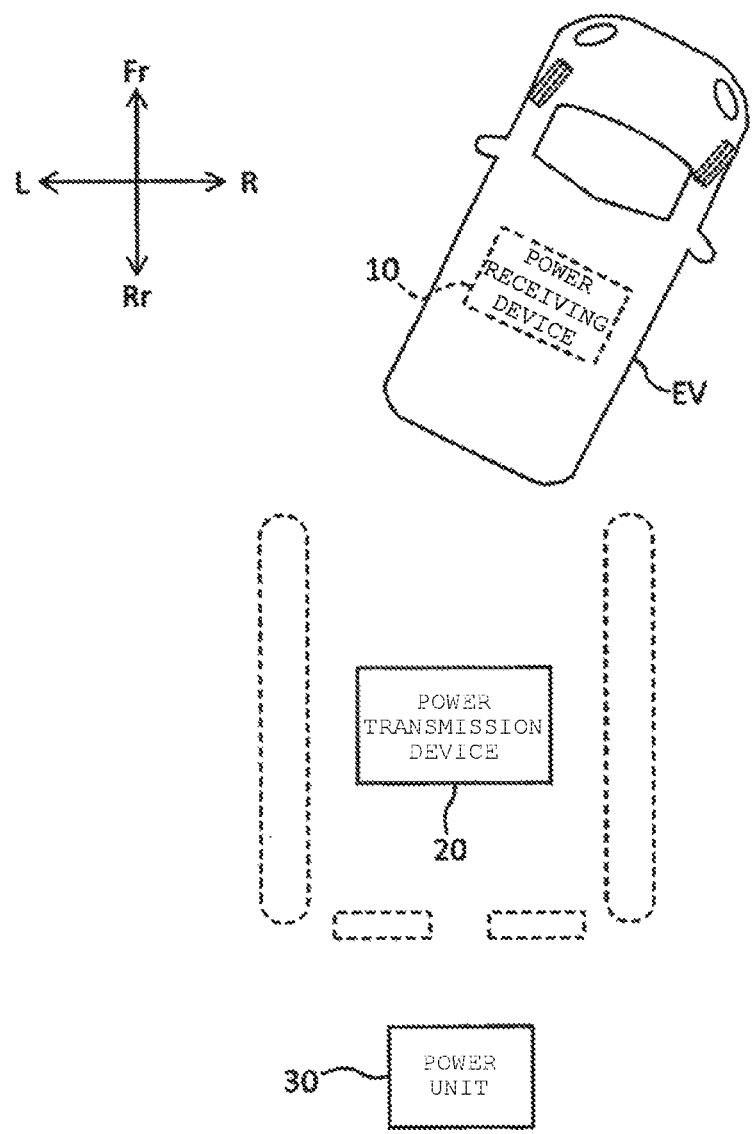
FIG. 1 is a top view illustrating a state where an electric vehicle is being parked at a parking position at which a power transmission device is installed.

An embodiment of the present invention will be described with reference to the accompanying drawings. The drawings are viewed in the directions of reference signs. In the following description, front and back, left and right, and up and down are directions viewed by a driver, and front, rear, left, right, upper, and lower sides of a vehicle will be denoted by reference signs Fr, Rr, L, R, U, and D, respectively in the drawings.

Figure 2:
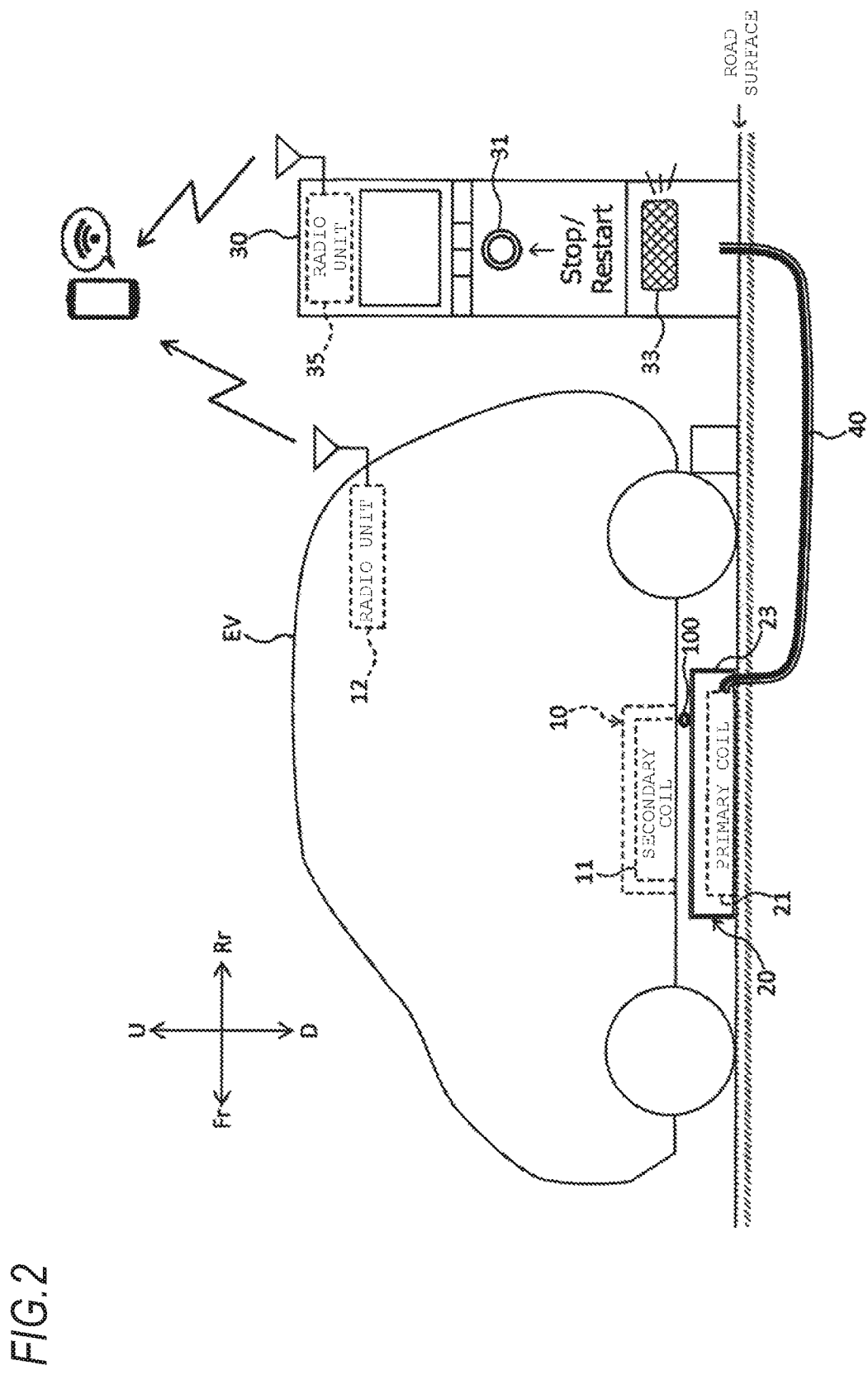
FIG. 2 is a side view illustrating a state where an electronic vehicle is parked at a parking position at which a power transmission device according to one embodiment is installed.

FIG. 1 is a top view illustrating a state where an electric vehicle is being parked at a parking position at which a power transmission device is installed. FIG. 2 is a side view illustrating a state where an electric vehicle is parked at a parking position at which a power transmission device is installed. As illustrated in FIGS. 1 and 2, a power transmission device 20 is installed at a parking position at which an electric vehicle EV equipped with a power receiving device 10 for receiving alternating current (AC) power in a non-contact manner is parked. The power transmission device 20 is installed on a road surface on which a parking facility is installed and is connected with an external power system such as a commercial power supply via a power supply unit 30. As illustrated in FIG. 1, a driver of the electric vehicle EV drives the electric vehicle EV backwards or forwards toward the power transmission device 20 and parks the electric vehicle EV at a position at which the power receiving device 10 of the electric vehicle EV faces the power transmission device 20.

Hereinafter, each constituent element of a non-contact charging system illustrated in FIGS. 1 and 2 will be described.

As illustrated in FIG. 2, the power transmission device 20 includes a primary coil 21 and a housing 23, and the power receiving device 10 of the electric vehicle EV includes a secondary coil 11. When current flows through the primary coil 21 of the power transmission device 20 due to AC power obtained from the external power system in a state where the winding surfaces of the respective coils face each other and close to each other, electromotive force is induced in the power receiving device 10 by the action of electromagnetic induction, and thus the induced current flows in the secondary coil 11. Due to this induced current, a battery of the electric vehicle EV is charged (in a non-contact manner) via a rectifier. In this way, non-contract power transmission from the power transmission device 20 to the power receiving device 10 is performed.

As illustrated in FIG. 3, a housing 23 of the power transmission device 20 is provided with an LED display 25 and a speaker 27, respectively, for visually and audibly informing the user of the fact that the non-contact power transmission is in progress while the power transmission device 20 is performing the non-contact power transmission. The LED display 25 is provided on the four side surfaces of the housing 23. The display surface of the LED display 25 lights up or flickers during the non-contact power transmission, and the text message "charging is in progress" is displayed in the center portion of the display surface.

Further, during the non-contact power transmission, the speaker 27 outputs noise of a volume that is not audible unless a person approaches the power transmission device 20.

The power supply unit 30 is connected to a power network via a power distribution facility (not illustrated) or the like and controls the supply of AC power to the power transmission device 20. The power supply unit 30 and the primary coil 21 of the power transmission device 20 are connected by a power cable 40 buried under the road surface. The power supply unit 30 includes a button 31 for temporarily stopping or resuming the non-contact power transmission from the power transmission device 20 to the power receiving device 10, a warning unit 33 for issuing a warning when the non-contact power transmission is temporarily stopped in response to the operation of the button 31, and a radio unit 35 for transmitting a radio signal to a predetermined destination corresponding to the owner of the electric vehicle EV.

The button 31 for temporarily stopping or resuming the non-contact power transmission can be operated even by a person (a third party) other than the owner of the electric vehicle EV. When the button 31 is pressed during the non-contact power transmission, the power supply unit 30 operates such that the non-contact power transmission is temporarily stopped. When the non-contact power transmission is temporarily stopped, the power supply unit 30 operates such that the warning unit 33 issues a warning. The warning may be at least one of a warning sound and a warning display. On the other hand, while the non-contact power transmission is temporarily stopped, the LED display 25 provided in the power transmission device 20 is turned off and the output of the speaker 27 is also stopped. When the non-contact power transmission is temporarily stopped, the power supply unit 30 may control the radio unit 35 to send an electronic notification indicating that the non-contact power transmission is temporarily stopped in response to the operation of the button 31 to the predetermined destination. An electronic device corresponding to the destination to which the radio unit 35 sends the electronic notification is a personal digital assistant (PDA) possessed by the owner of the electric vehicle EV or a wireless key or the like of the electric vehicle EV.

When a predetermined time (for example, 30 seconds) elapses without being resumed from the temporary stop of the non-contact power transmission by the operation of the button 31, the power supply unit 30 stops the warning by the warning unit 33 and controls the radio unit 35 to send an electronic notification indicating that the non-contact power transmission is temporarily stopped due to the operation of the button 31 to the predetermined destination. After the non-contact power transmission is temporarily stopped, when an obstacle 100 illustrated in FIG. 2 that has entered a space between the power transmission device 20 and the power receiving device 10 is removed by a third party or the like and the button 31 of the power supply unit 30 is pressed again, the power supply unit 30 operates so as to resume the non-contact power transmission. At this time, the power supply unit 30 controls the radio unit 35 to transmit an e-mail or the like indicating that the non-contact power transmission is resumed to the predetermined destination.

The electric vehicle EV monitors a stop and resumption of the non-contact power transmission in response to the operation of the button 31 of the power supply unit 30, and the electronic notification indicating that the non-contact power transmission is temporarily stopped and the electronic notification indicating that the non-contact power transmission is resumed may be sent by the radio unit 12 provided in the electric vehicle EV. A predetermined destination corresponding to the owner of the electric vehicle EV is registered in the radio unit 12, and the electronic notification sent by the radio unit 12 is transmitted to the registered predetermined destination.

As described above, according to the embodiment, even when an obstacle enters between the power transmission device 20 and the power receiving device 10 during the non-contact power transmission, a person who intends to remove the obstacle can remove the obstacle in a state where the non-contact power transmission is temporarily stopped by pressing the button 31 of the power supply unit 30. Since a third party other than the owner of the electric vehicle EV can also operate the button 31, a person who intends to remove the obstacle can take a precautionary measure against the magnetic field exposure, and afterwards the person can remove the obstacle between the power transmission device 20 and the power receiving device 10. Further, after removing the obstacle, the person can resume the non-contact power transmission by pressing the button 31 again, thereby saving the labor of the owner of the electric vehicle EV.

A person who intends to remove the obstacle can easily and certainly recognize that non-contact power transmission is in progress when bending down and looking at the obstacle entering between the power transmission device 20 and the power receiving device 10, with the informing information provided by the LED display 25 and the speaker 27.

Further, when the non-contact power transmission is temporarily stopped by the operation of the button 31, the warning unit 33 of the power supply unit 30 issues a warning. Therefore, a person who intends to remove the obstacle can recognize that the non-contact power transmission is temporarily stopped. In addition, it is possible to prompt resumption of non-contact power transmission by the warning. Furthermore, it is possible to prevent continuation of temporary stop of non-contact power transmission due to mischief, or the like by the warning.

Even when the owner of the electric vehicle EV is at a position away from the installation place of the non-contact charging system where the owner hardly recognizes the warning of the warning unit 33, the owner can recognize the fact that the non-contact power transmission is temporarily stopped due to the button 31 being pushed, from the electronic notification sent to the predetermined destination. Further, since the warning is stopped when the predetermined time elapses from the temporary stop of the non-contact power transmission, it is possible to eliminate annoyance caused by continuation of the warning.

Even when the owner of the electric vehicle EV is at a position away from the installation place of the non-contact charging system, the owner can recognize a charging state including that the non-contact power transmission is temporarily stopped or is resumed due to the operation of the button 31, from the electronic notification sent to the predetermined destination.

The present invention is not limited to the above-described embodiment, but may be appropriately modified, improved, changed, altered, and the like.

What is claimed is:
1. A non-contact charging system comprising:
   a power receiving unit mounted on a transportation device;

a power transmission unit, installed on a flat surface, configured to transmit power to the power receiving unit in a non-contact manner;

a power supply unit configured to control power supply to the power transmission unit, the power supply unit including an operation portion configured to temporarily stop or resume non-contact power transmission from the power transmission unit to the power receiving unit;

a warning unit configured to issue a warning when the non-contact power transmission is temporarily stopped in response to operation made to the operation portion; and a notification unit configured to send an electronic notification to a predetermined destination corresponding to an owner of the transportation device, wherein when a predetermined time elapses in a state where the non-contact power transmission is not resumed after the non-contact power transmission is temporarily stopped in response to operation made to the operation unit, the warning unit stops issuing the warning, and the notification unit sends an electronic notification to the predetermined destination indicating that the non-contact power transmission is temporarily stopped due to operation made to the operation portion, and wherein when the non-contact power transmission is resumed due to operation made to the operation portion, the notification unit sends an electronic notification to the predetermined destination indicating that the non-contact power transmission is resumed due to operation made to the operation portion.

2. The non-contact charging system according to claim 1, further comprising an informing unit configured to inform visually about information indicating that the non-contact power transmission is in progress while the power transmission unit is performing the non-contact power transmission.

3. The non-contact charging system according to claim 1, further comprising an informing unit configured to inform audibly about information indicating that the non-contact power transmission is in progress while the power transmission unit is performing the non-contact power transmission.

4. The non-contact charging system according to claim 2, wherein the informing unit is provided in the power transmission unit.

* * * * *